July 9, 1968

A. HALPERT 3,391,705

VALVE

Filed July 1, 1965

INVENTOR
ABBY HALPERT

BY Seidel & Gonda

ATTORNEYS.

United States Patent Office 3,391,705
Patented July 9, 1968

3,391,705
VALVE
Abby Halpert, Brooklyn, N.Y., assignor to Halvin Products Co., Inc., Brooklyn, N.Y., a corporation of New York
Filed July 1, 1965, Ser. No. 468,720
8 Claims. (Cl. 137—575)

ABSTRACT OF THE DISCLOSURE

A valve assembly comprising a plurality of modules each having a single inlet and two outlets or vice versa. The modules may be coupled to one another by means of a friction or snap fit. Each module is provided with a boss releasably coupled to a short valved conduit. One of the inlet or outlet passages in the last valve module of an arrangement may be closed by a removable cap.

---

This invention relates to a valve, and more particularly, to a valving arrangement having a multiple inlet with a single outlet or vice versa.

The valve assembly of the present invention comprises a plurality of valve housing modules selectively and simply interconnected. Each module has a single inlet and two outlets or vice versa. The modules are adapted to be readily coupled to one another by means of a friction fit or a snap fit. Each of the modules is provided with a boss releasably coupled to a short valved conduit. One of the inlet or outlet passages in the last valve module of the arrangement is preferably closed by a removable cap.

The present invention is particularly useful in connection with aquarium fluid flow systems wherein liquids and gases such as air are intermixed so as to provide oxygen for the fish. The entire valving arrangement is preferably small in size, with each module having a length of approximately one inch. The modules are preferably made from a flexible polymeric material such as polyethylene, rubber, and the like.

It is an object of the present invention to provide a novel valve.

It is another object of the present invention to provide a novel valve having a plurality of valve housing modules coupled together by a releasable connection.

It is another object of the present invention to provide a novel valve arrangement for use in aquariums.

It is still another object of the present invention to provide a novel convertible valve arrangement having a snap-fit or a friction fit joint between modules for rapid assembly and disassembly.

It is another object of the present invention to provide a novel multiple inlet single outlet valve wherein the inlets are selectively controllable and the outlet is not provided with any flow control means.

Other objects will appear hereinafter.

For the purpose of illustrating the invention there is shown in the drawings forms which are presently preferred; it being understood, however, that this invention is not limited to the precise arrangements and instrumentalities shown.

Figure 1:
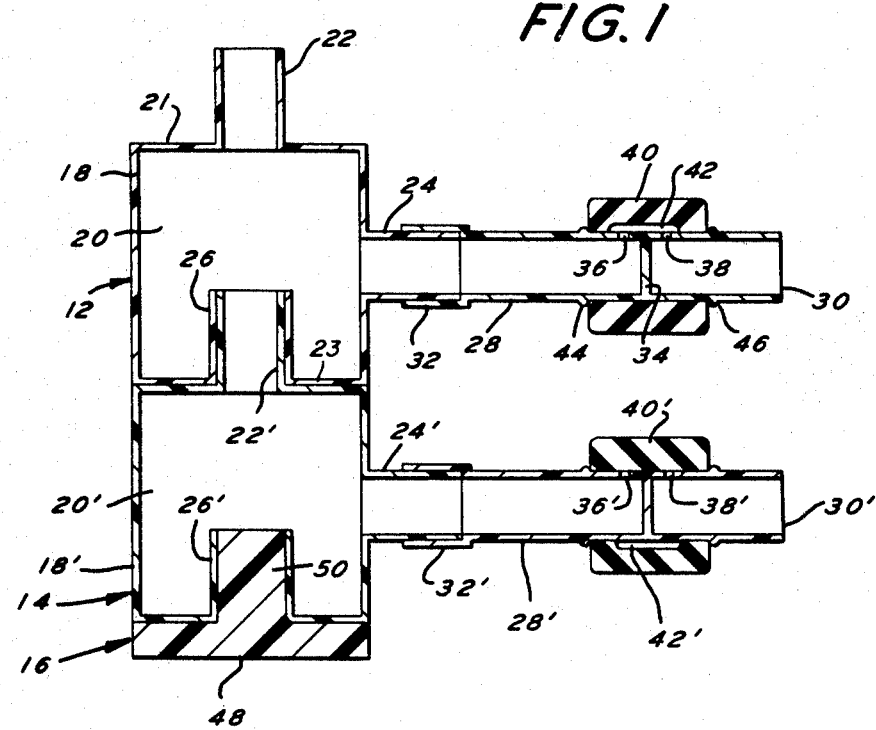
FIGURE 1 is a sectional view through a valve of the present invention.

Referring to the drawing in detail, wherein like numerals indicate like elements, there is shown in FIGURE 1 a longitudinal sectional view of a fluid flow control arrangement in accordance with the present invention designated generally as 10. The fluid flow control arrangement 10 includes a plurality of housing modules 12 and 14. A greater number of modules may be provided if desired or required in connection with any particular fluid flow arrangement. An end cap 16 is associated with the module 14.

The modules 12 and 14 are identical. Accordingly, only module 12 will be described in detail. Corresponding elements on module 14 are indicated with primed numerals.

The module 12 includes a body 18 having a chamber 20 therein. Body 18 is preferably injection molded from a flexible polymeric material such as polyethylene or the like. Body 18 may have any cross-sectional configuration. As illustrated, body 18 is cylindrical and provided with end walls 21 and 23.

The body 18 is provided with a boss 22 extending axially from the end wall 21. For purposes of illustration, boss 22 may be referred to as an inlet boss. Boss 22 is integral with the body 18 and is shorter in length than the body 18. As will be apparent from the drawing, the diameter of boss 22 is substantially smaller than the diameter of the body 18.

The body 18 is provided with another boss 24 integral therewith and extending in a radially outwardly direction. Boss 24 may be referred to as an outlet boss. Each of the bosses 22 and 24 are hollow so as to provide flow passages communicating with the chamber 20. The boss 24 is identical with the boss 22 insofar as length and diameter are concerned.

The body 12 is also provided with a passageway 26 coaxial with respect to boss 22. Passageway 26 may be referred to as an inlet passageway. The inner diameter of passageway 26 is substantially identical with the outer diameter of boss 22. The length of passageway 26 is substantially equal to the length of boss 22. The boss 22′ on housing module 14 is releasably coupled to the body 18 by a force-fit.

An outlet conduit 28 is releasably coupled to the boss 24. The inner and outer diameter of conduit 28 corresponds to that of bosses 22 and 24. The outer diameter of conduit 28 corresponds to the inner diameter of passageway 26.

The conduit 28 is provided with a free end 30 adapted to be releasably coupled to a pipe, conduit, or some other fluid handling device. The other end 32 of the conduit 28 is an enlarged end portion. Portion 32 is telescoped over boss 24 and releasably coupled thereto by a force-fit. Condit 28 may be injection molded with the same material as the bodies of the housing modules.

An imperforate wall 34 is provided intermediate the ends 30 and 32 in the conduit 28. As a result of the wall 34, the conduit 28 is provided with a first chamber directly communicating with the chamber 20 and a second chamber communicating with the free end 30. Radially outwardly directed ports 36 and 38 are provided on opposite sides of the wall 34 adjacent thereto.

A rotary sleeve valve member 40 is telescoped over the conduit 28 and rotatably supported thereby between beads 44 and 46. Valve member 40 is preferably made from a flexible or resilient material such as rubber. Valve member 42 is provided with an axially directed groove or passageway 42 on its inner peripheral surface adapted to communicate with each of the ports 36 and 38 in one rotary disposition of the member 42. When so aligned, the first and second chambers of the conduit 28 are in communication with each other by way of ports 36 and 38 and the passageway 42. For purposes of illustration, the valve member 40′ is illustrated in a rotative disposition wherein the first and second chambers of conduit 28′ are isolated from one another.

The cap 16 is provided with a body portion 48 having an axially directed boss 50. Boss 50 corresponds in length and diameter with the bosses 22 and 24. The boss 50 is force-fitted in the passageway 26′ of the module 14 or in the last module of the fluid flow control arrangement desired. Cap 16 is likewise made from the same material as the bodies for the modules and the conduits 28 and 28′.

In FIGURE 1, the boss 22 and the conduit 28′ may constitute inlets with conduit 28 being an outlet. Alternatively, the conduits 28 and 28′ may be inlets with a single uncontrolled outlet being provided by the boss 22. Also, it is possible to have the conduit 28 as an inlet with outlets being provided by boss 22 and conduit 28′. It is also possible to assemble a fluid flow control arrangement whereby end 30′ of conduit 28′ is force-fitted in the passageway 26. In the last mentioned arrangement, bosses 22 and 22′ may constitute inlets or outlets with valve 40′ offering the option to selectively control flow between the chambers 20 and 20′. While a rotary sleeve valve is illustrated on the conduits 28 and 28′, it is within the scope of the present invention to utilize a rotary disc valve having metering orifices so as to provide selective control of flow as opposed to flow control which is merely on or off.

Figure 2:
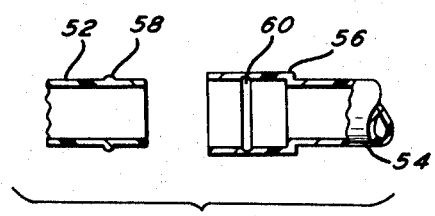
FIGURE 2 is a sectional view illustrating an alternaxtive coupling arrangement.

To provide a more rigid interconnection between the various modules, bosses, and cooperating structure an interrelationship may be provided as illustrated more clearly in FIGURE 2. Thus, a boss 52 is provided with a bead 58 on its outer periphery. A cooperating enlarged diameter end portion 56 on a conduit 54 or the like is provided with a groove 60 on its inner periphery. When assembled, the bead 58 will snap into the groove 60 and thereby provide a more rigid interconnection so as to prevent inadvertent disassembly of the fluid flow control arrangement.

Valve members 40 and 40′ are more flexible than the rest of the structure.

The simplicity of the present invention offers great advantages and opens up large areas of usage which heretofore were not possible because of the expense involved. The entire arrangement 10 as illustrated in FIGURE 1 may have an overall length of two inches or the like and can be made from injection molded thermoplastic materials of a polymeric nature on a mass produced basis while at the same time providing great versatility in the arrangement.

The present invention may be embodied in other specific forms without departing from the spirit or essential attributes thereof and, accordingly, reference should be made to the appended claims, rather than to the foregoing specification as indicating the scope of the invention.

I claim:

1. A valve arrangement comprising at least two housing modules, each module including a hollow body provided with at least two hollow bosses and a passageway each communicating with a central chamber, the central chamber being continuously open, a boss on one module removably coupled in the passageway on the other module, a separate conduit removably coupled to a boss on each module, each conduit having a rotary valve for controlling flow therethrough and said modules being made from a flexible polymeric material.

2. A valve arrangement in accordance with claim 1 wherein the coupling between the boss and passageway is a friction fit.

3. A valve arrangement in accordance with claim 2 wherein the coupling between each valve conduit and a boss is a friction fit.

4. A valve arrangement in accordance with claim 1 wherein one of the bosses and the passageway on each module are coaxially disposed on opposite ends of the hollow body, each boss having the same outer diameter corresponding to the inner diameter of the passageway.

5. A subcombination comprising a housing module having a hollow body, said body being provided with at least two hollow bosses and a passageway communicating with a central chamber, said central chamber being continuously open, the bosses having the same outer diameter corresponding to the inner diameter of the passageway, the length of the passageway being substantially equal to the length of said bosses, a valved conduit, the outer diameter of said valved conduit at one end corresponding to the outer diameter of one of said bosses and the other end of said valved conduit being coupled to said one of said bosses, and said module being made from a flexible polymeric material.

6. A subcombination in accordance with claim 5 including a cap having an integral boss, said last-mentioned boss being force-fitted in said passageway.

7. A subcombination in accordance with claim 6 wherein said passageway is coaxial with one of said bosses.

8. A subcombination in accordance with claim 5 wherein said passageway and one boss are aligned and extend in the same direction.

References Cited

UNITED STATES PATENTS

| | | | |
|---|---|---|---|
| 2,735,699 | 2/1956 | Chadbourne | 285—423 X |
| 2,861,388 | 11/1958 | Favaretto | 46—16 |
| 3,047,025 | 7/1962 | Davis | 285—260 X |
| 3,199,538 | 8/1965 | Anthon | 251—367 X |

FOREIGN PATENTS 148,085   7/1920   Great Britain.

HENRY T. KLINKSIEK, *Primary Examiner.*